(12) United States Patent
Wischnewskij et al.

(10) Patent No.: US 7,834,518 B2
(45) Date of Patent: Nov. 16, 2010

(54) LINEAR ULTRASOUND MOTOR

(75) Inventors: Wladimir Wischnewskij, Waldbronn (DE); Alexej Wischnewskij, Woerth (DE)

(73) Assignee: Physik Instrumente (PI) GmbH & Co. KG, Karlsruhe (DE)

( * ) Notice: Subject to any disclaimer, the term of this patent is extended or adjusted under 35 U.S.C. 154(b) by 598 days.

(21) Appl. No.: 11/659,741

(22) PCT Filed: Apr. 20, 2005

(86) PCT No.: PCT/EP2005/004236
§ 371 (c)(1),
(2), (4) Date: Jan. 28, 2008

(87) PCT Pub. No.: WO2006/027031
PCT Pub. Date: Mar. 16, 2006

(65) Prior Publication Data
US 2009/0009032 A1    Jan. 8, 2009

(30) Foreign Application Priority Data

Sep. 3, 2004  (DE) .................. 10 2004 042 767
Oct. 14, 2004 (DE) .................. 10 2004 050 108
Dec. 9, 2004  (DE) .................. 10 2004 059 429

(51) Int. Cl.
*H02N 2/00* (2006.01)
*H01L 41/09* (2006.01)

(52) U.S. Cl. .............. 310/323.13; 310/323.02; 310/323.06; 310/323.17

(58) Field of Classification Search ................. 310/323.01–323.19
See application file for complete search history.

(56) References Cited

U.S. PATENT DOCUMENTS

| | | | | |
|---|---|---|---|---|
| 4,510,411 A * | 4/1985 | Hakamata et al. | ...... | 310/316.02 |
| 4,630,941 A * | 12/1986 | Chainer et al. | .................. | 384/1 |
| 4,978,882 A | 12/1990 | Kitani | ........................ | 310/328 |
| 5,672,930 A | 9/1997 | Narisawa et al. | ............. | 310/323 |
| 5,936,328 A * | 8/1999 | Takano et al. | .......... | 310/323.02 |
| 6,051,912 A * | 4/2000 | Gonda | .................... | 310/323.02 |
| 6,188,161 B1 * | 2/2001 | Yoshida et al. | ............... | 310/328 |
| 6,331,747 B2 * | 12/2001 | Yoshida et al. | .......... | 310/313 R |
| 6,747,394 B2 * | 6/2004 | Johansson et al. | ....... | 310/323.02 |
| 6,768,245 B2 * | 7/2004 | Mock et al. | ............. | 310/323.02 |
| 6,979,934 B1 * | 12/2005 | Wischnewskiy | ....... | 310/323.01 |
| 7,315,108 B2 * | 1/2008 | Okamoto et al. | ........ | 310/323.17 |
| 2001/0015591 A1 | 8/2001 | Yoshida et al. | .......... | 310/313 B |
| 2008/0073999 A1* | 3/2008 | Wischnewskij et al. | | 310/323.03 |
| 2008/0211348 A1* | 9/2008 | Wischnewskij et al. | | 310/323.02 |

FOREIGN PATENT DOCUMENTS

| DE | 19945042 | 4/2001 |
|---|---|---|
| EP | 0595426 | 5/1994 |
| JP | 59204477 | 11/1984 |
| JP | 63213482 | 9/1988 |

\* cited by examiner

*Primary Examiner*—Thomas M Dougherty
(74) *Attorney, Agent, or Firm*—Gerald T. Bodner (57) ABSTRACT

The invention relates to a linear ultrasound piezoelectric motor comprising a mobile element that is in frictional contact with a plate-like rectangular resonance plate, wherein the frictional surface is embodied by means of at least one of the longitudinal narrow sides of the resonance plate, and electrodes for producing acoustic vibrations which are arranged on the longitudinal wide sides of the resonance plate. According to the invention, the generator for producing acoustic vibrations is asymmetrically arranged in relation to a plane which symmetrically cross-cuts the resonance plate, and comprises two opposing electrodes generating a stationary asymmetrical space wave when excited.

20 Claims, 12 Drawing Sheets

LINEAR ULTRASOUND MOTOR

The invention relates to a linear ultrasound piezoelectric motor comprising a mobile element that is in frictional contact with a plate-like rectangular resonance plate, wherein the frictional surface is embodied by means of at least one of the longitudinal narrow sides of the resonance plate, and to electrodes for producing acoustic vibrations which are arranged on the longitudinal wide sides of the resonance plate, according to the preamble of patent claim 1.

Linear ultrasound motors are known from the U.S. Pat. No. 4,978,882 which operate, according to the principle of piezoelectric excitation, in a circular oscillator as closed waveguide. Such motors have a very complicated construction, with several piezoelectric elements to be adhesively fixed to a circular oscillator, e.g. by gluing. Therefore, such motors are very expensive to manufacture and can be miniaturized only to a limited extent.

According to the U.S. Pat. No. 5,672,930 the state in the art includes ultrasound motors which use the excitation of a moving ultrasonic wave in a rod oscillator, i.e. in an open waveguide. The disadvantage of such motors is the fact that it is practically impossible to excite an exactly moving ultrasonic wave in an open waveguide because a symmetrical stationary wave is excited in an open waveguide simultaneously with the excitation of a moving wave, which negatively affects the action of the frictional contact of the motor. This, in turn, results in a strong heating of the frictional surfaces and the entire motor, respectively, as well as in a high noise level. Moreover, these motors according to the state in the art require a very high excitation voltage and are expensive to manufacture and hardly miniaturisable.

The most obvious solution is characterized by piezoelectric ultrasound motors, e.g. according to DE 199 45 042 C2. With such motors, a stationary longitudinal wave as well as a bending wave are excited in the piezoelectric plate-like resonator at the same time. As a result of the interference of both waves an impact element arranged at the resonator undergoes an elliptical movement. This impact element transfers the movement to a further mobile element which is supported by ball-bearings and pressed against the impact element. Here, however, the use of a relatively expensive ball-bearing is a drawback, especially under the financial aspect.

The use of significantly more inexpensive slide bearings involves friction losses in the bearing, which are comparable with the turning force developed by the actuator or transmitted through the friction contact, respectively. For this reason, the renunciation of the ball bearing, which would be obvious per se, is problematical. Another problem is the embodiment of the ball bearings of magnetic materials, so that such motors cannot be used for non-magnetic applications.

Based on the above it is, therefore, the object of the invention to provide a further developed linear ultrasound piezoelectric motor comprising a mobile element that is in frictional contact with a plate-like rectangular resonance plate, wherein the motor only has a small physical size and the entire construction is simple and possible with a small number of components.

Also, the excitation voltage of the motor to be developed is to be small, and an increased efficiency is to be obtained. By means of the novel constructional design of the motors to be provided they are to be suitable particularly for use in fine positioning apparatus such as in miniaturized X-Y tables, in microrobots or the like mechatronic apparatus.

The solution of the object according to the invention is achieved with a linear ultrasound piezoelectric motor according to the feature combination of patent claim 1, with the dependent claims representing at least useful embodiments and advancements.

According to the invention, the generator for producing acoustic vibrations is asymmetrically arranged in relation to a plane which symmetrically cross-cuts the resonance plate, and comprises two opposing electrodes generating a stationary asymmetrical space wave when excited.

Such a construction of the generator for producing the necessary vibrations not only allows the excitation of the aforementioned asymmetrical space wave, but the length of the frictional contact can be increased significantly and a simple arrangement of the frictional surface on the oscillator and of the friction element on the mobile element can be realized.

The arrangement of a generator for producing acoustic vibrations on both sides of the symmetrically cross-cutting plane enables the achievement of a reverse of motion of the mobile element by switching the generators, so that oscillating motions can be produced in a simple manner.

At least one of the longitudinal narrow sides may comprise a guide groove, a guide channel or a guiding rail, with the guide groove, the guide channel or the guide rail having a wear-resistant coating or being made of such a material.

The mobile element may be embodied as a spring clip which is mechanically operatively connected to the longitudinal narrow sides.

The spring clip may, for example, be U-shaped or V-shaped, with the free legs carrying a friction element and the friction element having a shape complementary to each one of the guide groove, guide channel or guide rail.

In one embodiment of the invention, the legs of the spring clip include an attachment portion or attachment section which is formed as a holder for a mobile object, particularly a lens.

The resonance plate of the ultrasound piezoelectric motor may be made of a monolithic piezoelectric material or body, wherein components of this body then fulfill the function of the generator for producing acoustic vibrations by means of the corresponding excitation electrodes.

Alternatively, it is possible to produce the resonance plate of a non-piezoelectric material, with the generators for producing acoustic vibrations being mechanically rigidly connected to the resonance plate.

In the method for electrically operating a linear ultrasound piezoelectric motor as explained above the excitation source is preferably embodied as a current feedback self-adjusting generator having a fixed working frequency, with the working frequency being predefined by that resonance frequency of the piezo-oscillator that leads to the excitation of a stationary asymmetrical space wave.

Thus, the oscillator of the ultrasound piezoelectric motor has a preferably rectangular resonance plate with at least one smooth frictional surface. The mobile element includes at least one friction element being operatively connected to the frictional surface of the oscillator. The generators and accordingly also the electrodes for producing acoustic vibrations of the oscillator are thereby arranged asymmetrically in relation to a plane of symmetry which cross-cuts the plate. Based on such an arrangement an asymmetrical acoustic stationary space wave is generated in the oscillator when the ultrasound motor is electrically excited, which drives the mobile element.

In one embodiment the motor according to the invention may be configured such that the ultrasound oscillator has two generators of acoustic vibrations, with each of the generators being arranged asymmetrically in relation to a plane of symmetry which cross-cuts the plate, and, moreover, a changeover switch is provided connecting either the one or the other generator to the necessary electric excitation source so that, as a consequence, the reversing motion of the mobile element already explained above becomes possible.

The frictional surface of the motor according to the invention may be arranged either in one or both of the guide channels located on the longitudinal narrow sides of the oscillator plate. Moreover, the frictional surface may be arranged on a guide rail which is also located on one of the two longitudinal narrow sides of the oscillator plate. Both allow for the fixation of the mobile part in the direction vertical to its movement.

For prolonging the service life and for improving the long-term stability the surface of the guide channel or the guide rail may be provided, in each embodiment of the inventive motor, with a wear-resistant layer or intermediate layer onto which the actual friction layer is then applied.

In one embodiment of the inventive motor a two-part solution for the mobile element has been chosen, in which each part is spring-mounted with respect to the opposing part in the direction of the frictional surface so that the use of specific linear guides is not necessary.

With respect to the aforementioned embodiment of the self-adjusting generator (autogenerator) a continuous tracking of the resonance frequency of the ultrasound motor is possible, so that an improved functional stability of the entire assembly is achieved also under this aspect.

The invention will be explained in more detail below by means of various exemplary embodiments and with the aid of the figures. In the figures.

Figure 1:
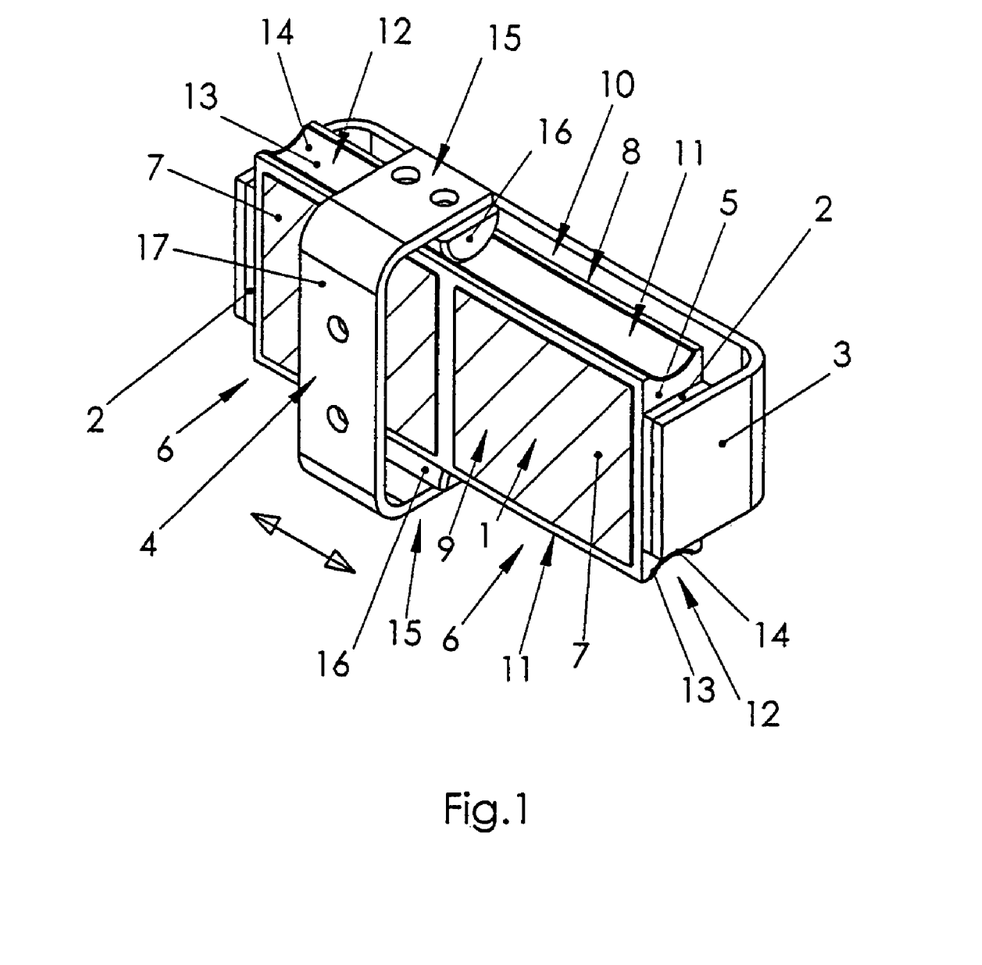
FIG. 1 shows an illustration of the first embodiment of the motor according to the invention.

According to the illustration shown in FIG. 1 the motor according to the invention comprises an ultrasound oscillator 1 which is located in a holder 3 by means of antivibration backings 2. Moreover, the mobile element 4 is shown, which is in frictional contact with the oscillator. The ultrasound oscillator 1 is formed of a rectangular resonance plate 5 and one or two generators for producing acoustic vibrations 6.

Basically, two constructive variants of the motor according to the invention are realizable.

In a first embodiment the plate 5 is entirely made of a piezoelectric material, e.g. lead titanate zirconate, barium titanate, a crystalline quartz, lithium niobate or similar piezoelectric materials.

Each of the generators of acoustic vibrations 6 includes an excitation electrode 7 (FIG. 1) and a common back electrode 8. Both electrodes are located on the longitudinal wide sides 9 and 10 of plate 5. In this embodiment, each generator of acoustic vibrations 6 represents a part of the piezoelectric plate 5. The oscillator itself is formed as a monolithic piezoelectric body.

In the second modified embodiment of the motor the oscillator 1 is formed as an assembled oscillator, with the generators 6 being connected to the plate 5.

In both embodiments either guide channels 12 (FIG. 1) or guide rails 30 (FIG. 11) are provided on the longitudinal narrow sides 11 of plate 5. The frictional surface 13 is provided directly on the wear-resistant layer 14.

To prevent an abnormal wear of the frictional contact of the motor the wear-resistant layer 14 is applied onto the surface of the guide channel 12 or guide rail 30 as a thin wear-resistant film made of metal, ceramics, glass or another respectively optimized material.

If the motor is realized with a guide rail, the wear-resistant layer may be a thin plate which is applied onto the longitudinal narrow side 11 of plate 5 by means of a glued joint.

The mobile element 4 of the motor can be composed of two parts 15, with each one thereof being equipped with a friction element 16 located in the guide channel 12. Moreover, each of the parts 15 can be fixed with respect to the other part 15 by means of the spring 17 in a spring-loaded manner to press the friction elements 16 elastically against the frictional surface 13. In this case, the spring 17 may serve as a holder of the mobile element, e.g. an adjuster, a magnetic head or a similar device.

Figure 2:
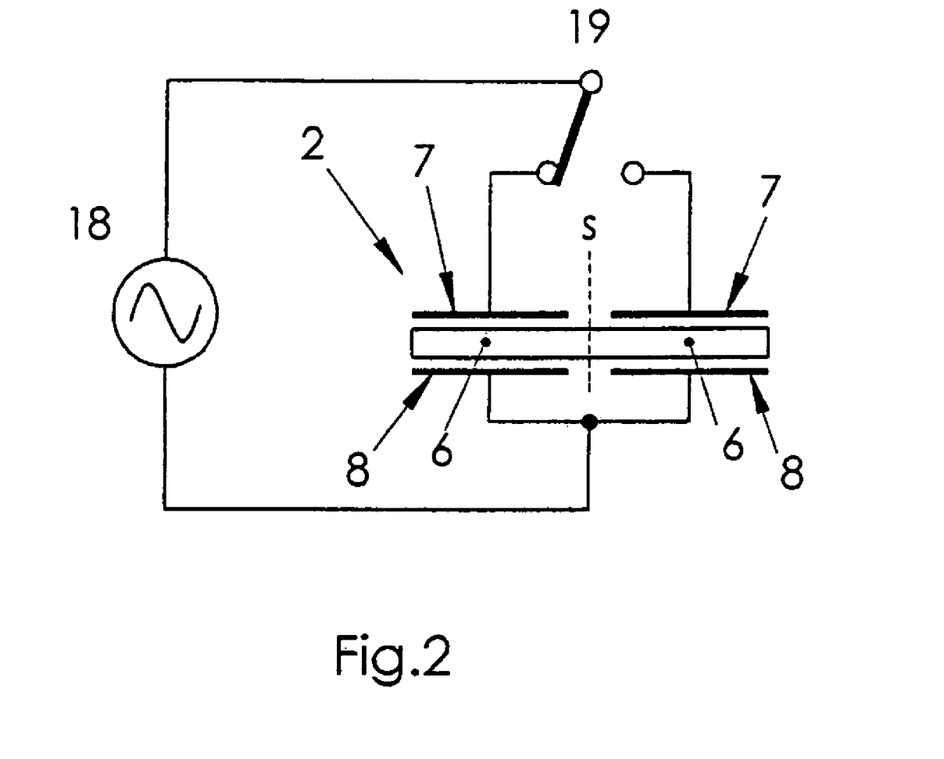
FIG. 2 shows an exemplary wiring of the motor according to the first embodiment of the invention.

FIG. 2 shows an exemplary wiring scheme of the oscillator with an electric excitation source 18. According to the functional principle of the inventive motor the electric excitation source 18 is connected to a corresponding generator 6 in response to the direction of movement of the mobile element 4. The switching of the generators then takes place by means of the changeover switch 19 in response to the desired direction of movement.

Figure 3:
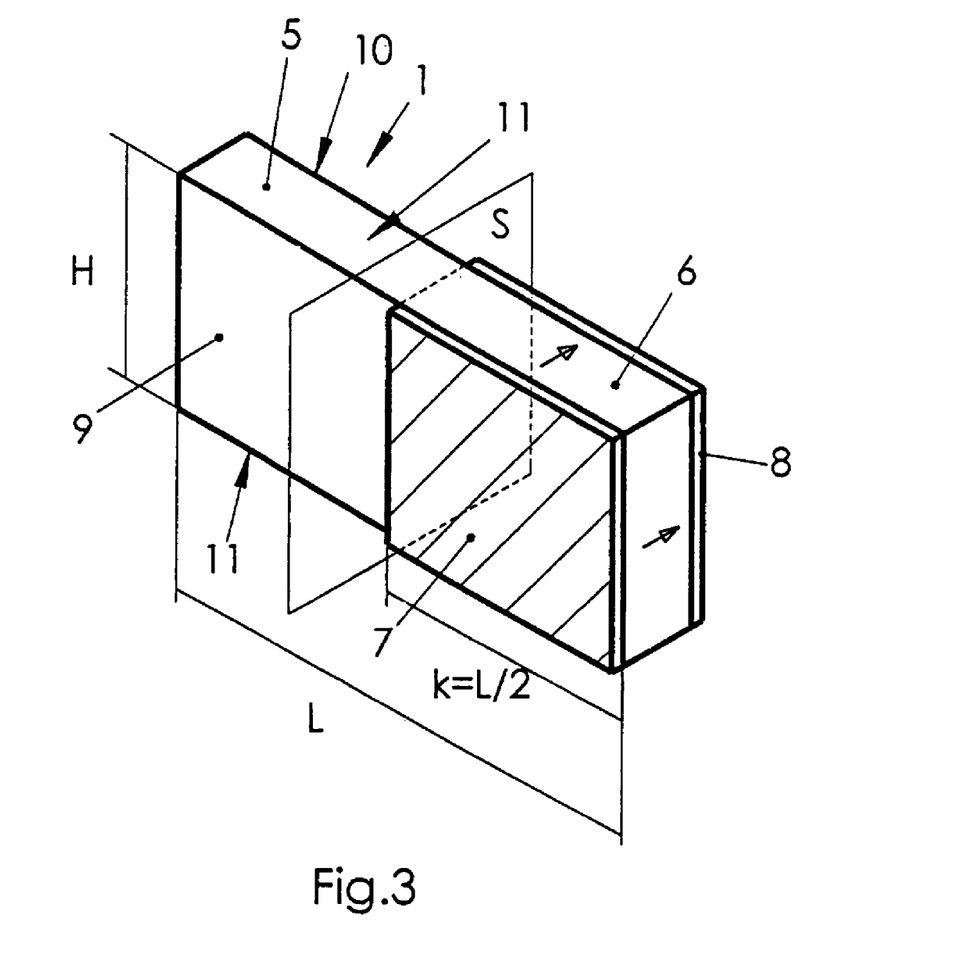
FIG. 3 shows a first example for explaining the structure of the generator for producing acoustic vibrations.
Figure 4:
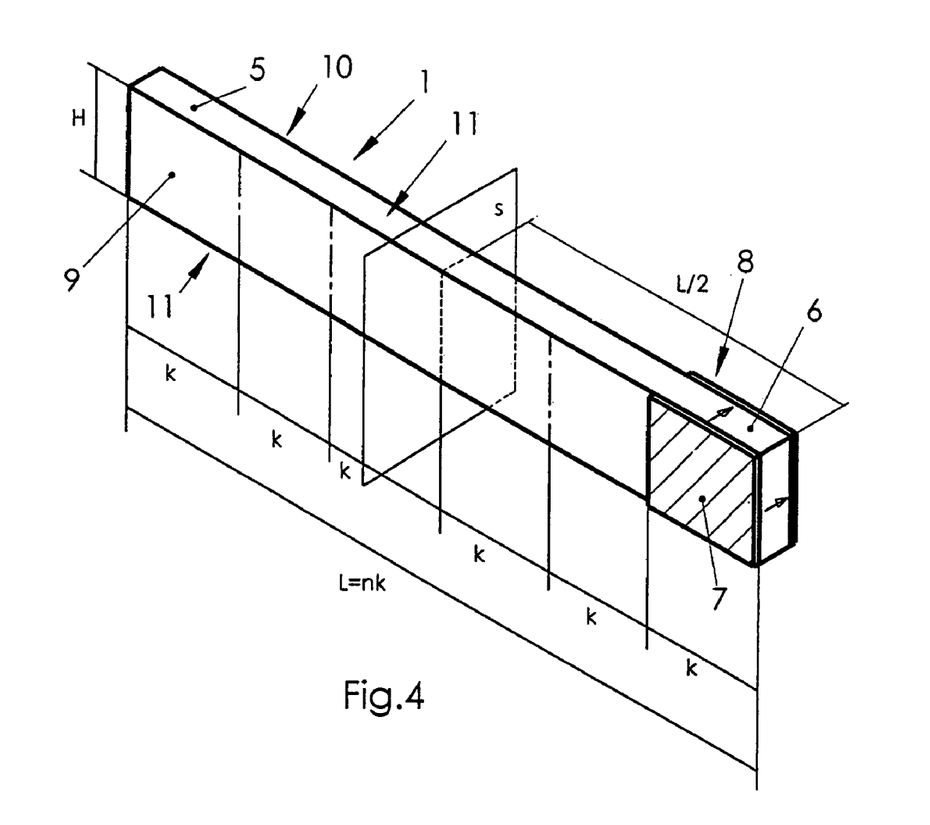
FIG. 4 shows a second example of the structure of the generator for producing acoustic vibrations.

FIGS. 3 and 4 illustrate different constructional variants of the oscillator 1. For explaining the construction of oscillator 1 and the mode of operation of the motor FIGS. 3 and 4 show the plane of symmetry S which cross-cuts the plate 5. The plane intersects the plate in the middle of its length L, extends vertically to the large side 9 and is also shown vertically to the longitudinal narrow sides 11.

The generator for producing acoustic vibrations 6 of the oscillator 1 is asymmetrical in relation to the plane of symmetry S, i.e. it is arranged only on one side for the corresponding direction of movement.

FIG. 3 shows the oscillator 1 for exciting an asymmetrical acoustic first-order space wave. In this case, the ratio of the plate length L to its height H is approximately 2 to 3 (L/H=2 to 3).

According to FIG. 1 it is also possible to provide an elongated oscillator, namely to excite asymmetrical stationary space waves of a higher, e.g. sixth order. The wave order is determined by the length of the plate 5. It is selected from the ratio L=n·K, with n=4, 6, 8 . . . and K=0.7 to 1·H.

Figure 5:
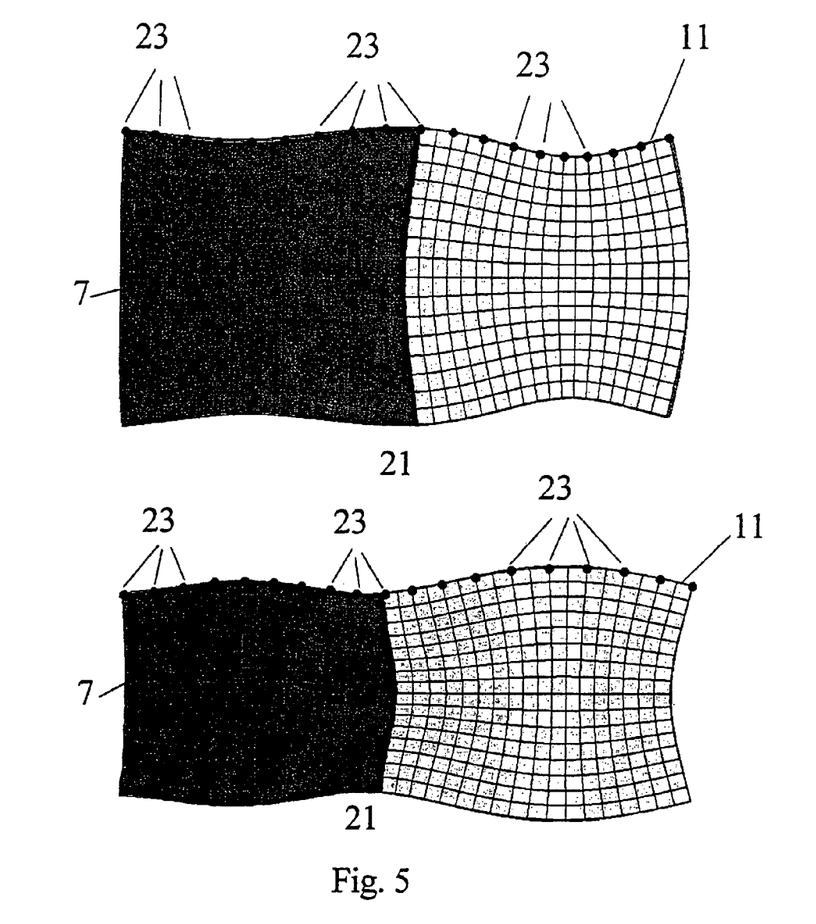
FIG. 5 shows representations with respect to the deformation of the oscillator or generator for producing acoustic vibrations.

According to FIG. 5, positions 20 and 21, deformations of the plate 5 of the oscillator 1 are shown, namely when an asymmetrical stationary first-order space wave is excited. The pictures correspond to the borderline cases of the deformation which are apart in terms of time by half an oscillation period T/2.

Figure 6:
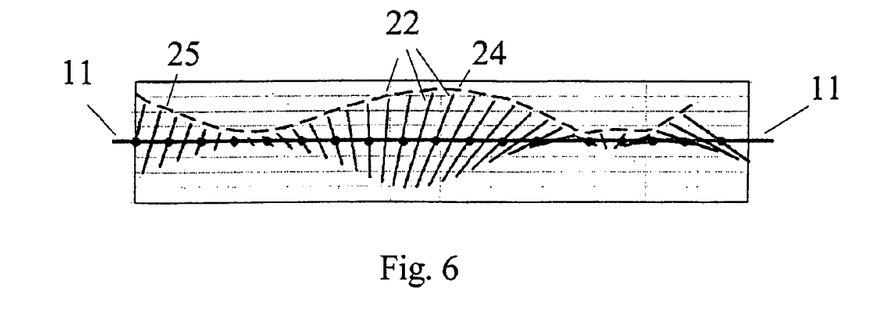
FIG. 6 shows paths of motion of points along the longitudinal narrow sides 11 of the rectangular plate 5.

FIG. 6 shows paths of motion 22 of points 23 positioned on the longitudinal narrow sides 11 of plate 5, namely when the stationary first-order wave illustrated in FIG. 5 is excited. It can be seen that the stationary first-order wave has a maximum 24 on the amplitude curve 25.

Figure 7:
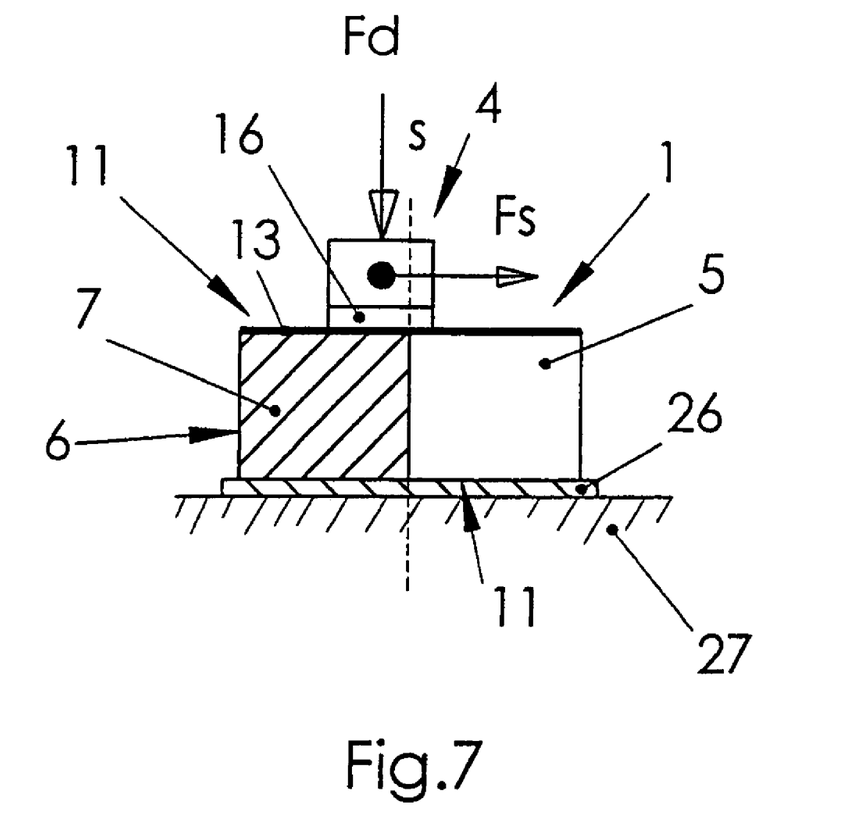
FIG. 7 shows a schematic illustration of the forces occurring during the operation of the motor.

FIG. 7 shows the mode of operation of the motor based on the active mechanical force components.

On one side, the oscillator 1 is supported via an antivibration backing 26 on a stationary base body 27. By the force $F_d$ the mobile element 4 is pressed against the opposing side 11 of the oscillator 1. The longitudinal narrow side 11 is provided with the frictional surface 13 and the mobile element 4 is provided with the friction element 16. As a result of the influence of the forces acting when the oscillator is excited on the mobile element 4 a force $F_s$ is generated which produces the movement of the mobile element.

Figure 8:
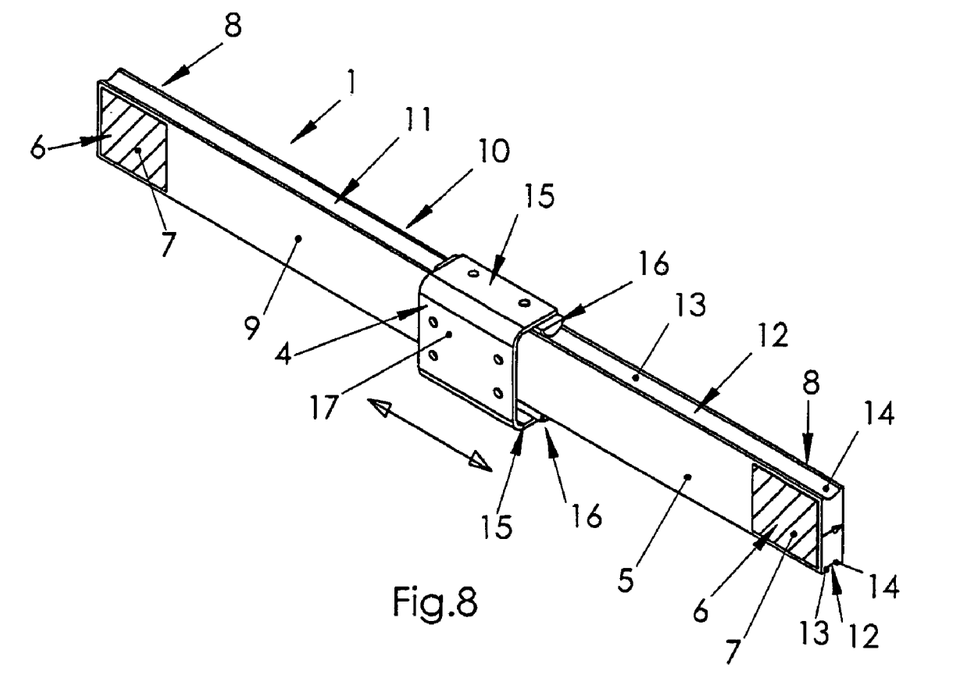
FIG. 8 shows an exemplary embodiment of the motor with an elongated oscillator.

FIG. 8 shows a modified embodiment of the motor with an elongated oscillator the mode of operation of which corresponds to the one illustrated in FIG. 4.

Figure 9:
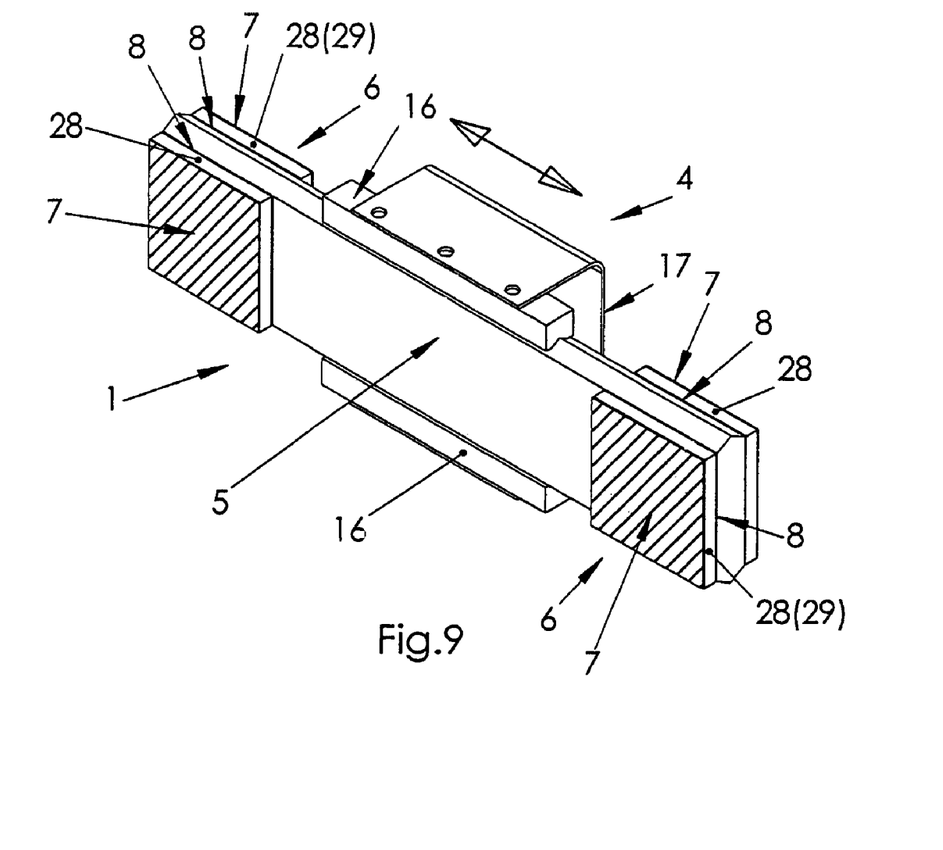
FIG. 9 shows a modified embodiment of the rectangular plate made, for example, of a steel material with, for example, generators 6 glued onto the same.
Figure 10:
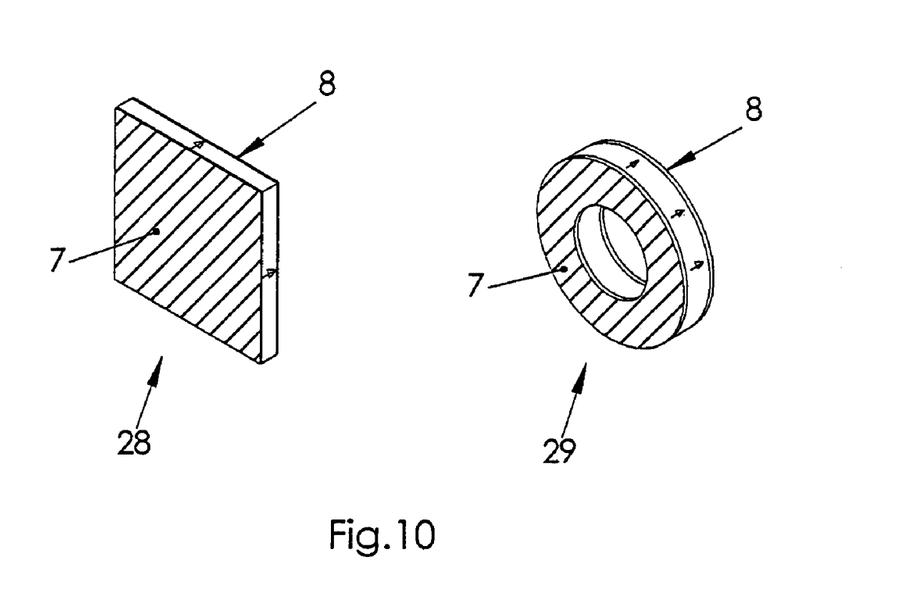
FIG. 10 shows different modified embodiments of the piezoelectric elements for a motor embodiment with an assembled oscillator.

FIG. 9 shows a modified embodiment of the motor with an assembled oscillator 1. In this alternative the resonance plate 5 is made of a non-piezoelectric material, e.g. steel, ceramics, metal-ceramics, a monocrystal or similar materials. The generators of acoustic vibrations 6 are thereby embodied as piezoelectric elements which are rigidly connected with the plate 5. Piezoelectric plates 28 or discs 29 may be used as such generators, with electrodes 7 and 8 correspondingly located on their surfaces (see FIG. 10).

Figure 11:
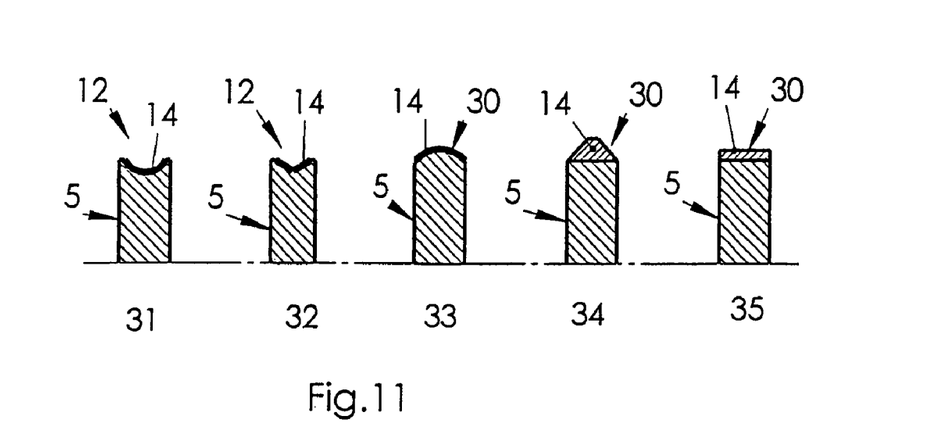
FIG. 11 shows different sectional detail views of modification in view of the embodiment of the guide channels, guide grooves, guide rails or frictional surfaces, respectively.

FIG. 11 shows alternatives of channels 12 or rails 30. The channels 12 may have a round or triangular cross-sectional profile (positions 31 and 32). The rails 30 may also have a round, triangular or quadrangular profile (positions 33, 34, 35).

Figure 12:
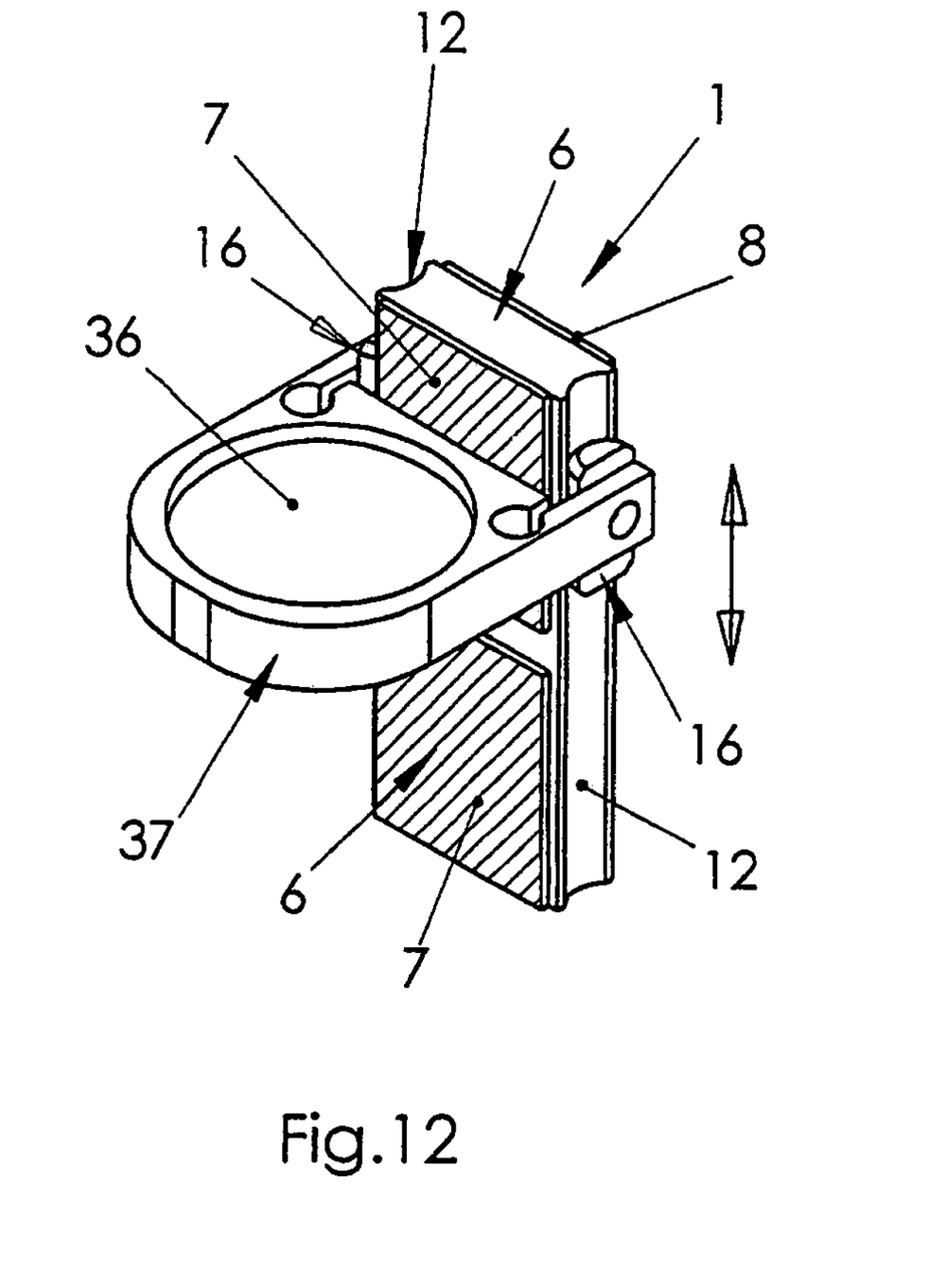
FIG. 12 shows an exemplary form of realizing the motor according to the invention with a holder for an optical element, especially a movable lens.

According to FIG. 12 a motor according to the invention is to be used, as an example, for adjusting a lens 36 of an objective located in the holder 37.

Figure 13:
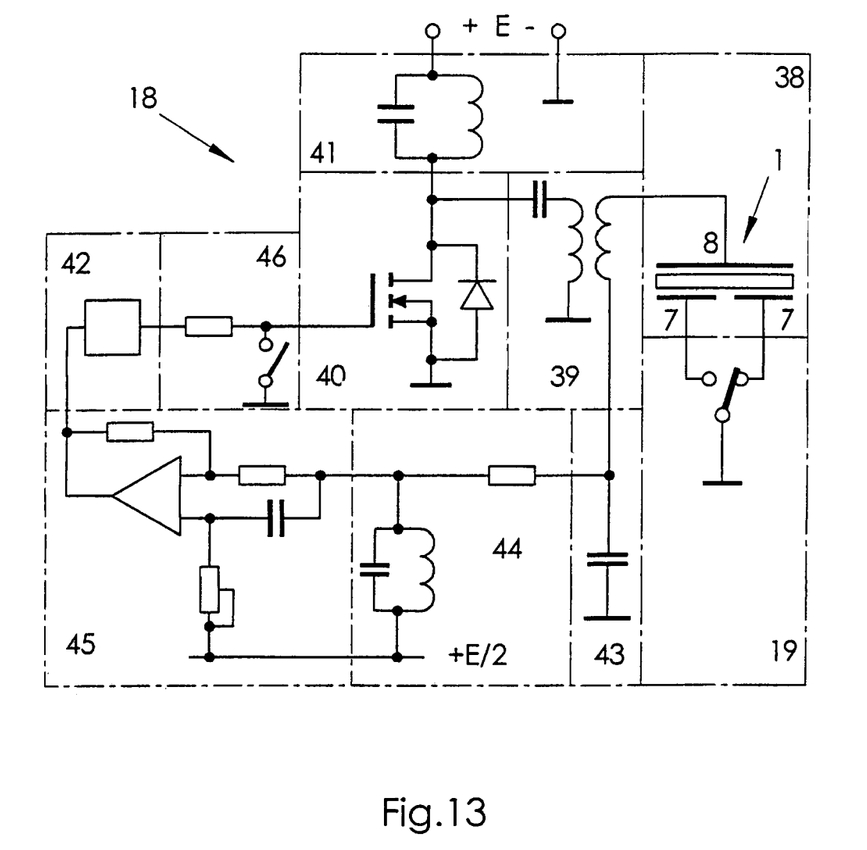
FIG. 13 shows a block diagram of the self-adjusting current feedback generator for operating the motor according to the invention.

FIG. 13 discloses a possible circuit configuration of an alternative of the electric excitation source 18 which is configured according to the principle of a self-adjusting generator. The motor to be driven is designated with reference numeral 38. Moreover, a changeover switch 19, an adaptor 39, a current changeover switch 40, a power source 41, a driver 42, a feedback member 43, a filter 44, a phase shifter 45 and a switch-off means 46 are provided.

The mode of operation of the motor will be explained below.

When connecting the motor to the electric excitation source 18 (see FIG. 2) the electrodes 7 or 8 of the generator 6 are supplied with an electric alternating voltage, namely with a frequency that corresponds to the working frequency $F_a$ of the oscillator 1.

With the frequency $F_a$ an asymmetrical stationary space wave is excited in the oscillator 1, which may correspond to the first, second or a higher order, in dependence on the length L of the oscillator. The order of the excited stationary wave corresponds to the number of the maximums of the amplitude curve.

Thus, the first-order stationary wave has one maximum (see FIG. 5, 6), the second-order stationary wave has two maximums, the third-order stationary wave has three maximums etc.

The working frequency $F_a$ corresponds to the resonance frequency of plate 5 for the asymmetrical stationary wave and is dependent on the dimensions of the plate and on the material properties of the same.

The value of the working frequency $F_a$ can be determined from the relationship $F_a = m \cdot N/L$, with L being the length of the plate, N the frequency constant for the type of stationary wave as used and m the order of the wave (m=1, 2, 3 and so on).

For example, the frequency constant for the first order wave (m=1) and for the plate 5 made of a piezoceramic material PIC181 of the company PI Ceramic GmbH is N=39600 kHz·mm, i.e. $F_a$=396 kHz for the plate length L=10 mm, $F_a$=198 kHz for L=20 mm and $F_a$=132 kHz for L=30 mm.

When exciting an asymmetrical stationary space wave in oscillator 1 (see FIG. 5) the points 23 of the frictional surface 13 positioned on the longitudinal narrow sides 11 of plate 5 vibrate along the paths of motion 22 (see FIG. 6). The paths of motion of these points represent straight lines which are differently inclined to the surfaces of the longitudinal narrow sides depending on the position. The characterizing feature of asymmetrical stationary waves is the preferably identical inclination of these lines 22 (paths of oscillation of the points) in the central area of plate 5. For the first-order stationary wave illustrated in FIGS. 5 and 6 these lines have an inclination facing away from generator 6.

This preferable inclination of the paths of motion of the points leads to the creation of a force $F_d$ which is likewise oriented in the direction of the preferable inclination of the paths of motion 22. This force is the result of the addition of forces of all points of the frictional surface 13 in relation to the friction element 16. The force $F_s$ acts on the friction element 16 and causes the mobile element 4 to be shifted in the working direction of this force.

Switching the excitation source 18 from one generator 6 to the other generator by means of the changeover switch 19 (FIG. 2) allows a change of the directions of inclination of the paths of motion 22 in the opposite orientation, which then leads to the reversal of the motion of the mobile element.

In ultrasound motors with the excitation of asymmetrical stationary first-order space waves (FIG. 1, 3, 12) the length of travel of the mobile element 4 is limited to 0.3 L to 0.4 L. The length of the shift range depends on the length of the friction element 16 and amounts, in the maximum borderline case, to approximately 0.5 L. In motors with an excitation at higher wave orders (FIG. 4, 8, 9) the shift range may reach the value 0.7 L. In these motors the length of the friction element 16 is not smaller than the distance between two vibration maximums 24. In this case, two or more maximums are superimposed by the friction element which allows the generation of a uniform driving force along the entire length of plate 5.

The electric excitation source 18 of the motor according to the invention can generate either an electric alternating voltage with a fixed frequency for exciting the motor or can be realized as a self-adjusting generator (autogenerator) 18, with the frequency of the autogenerator being predefined by the oscillator 1. A modified block diagram of such an excitation source is shown in FIG. 13.

The circuit as shown represents a current feedback self-adjusting generator, with the current being carried over the electrodes 7, 8. The phase characteristic between the excitation voltage on the oscillator and the current flowing through the oscillator is used to keep the excitation frequency of the circuit on the working frequency $F_a$ of the oscillator 1. On the oscillator resonance frequency $F_a$, i.e. the frequency on which the asymmetrical stationary wave is excited, this characteristic has a zero phase shift.

When the electrodes 7, 8 of the oscillator 1 are supplied with an electric excitation voltage an electric voltage drops via the feedback element 43 which is shifted with respect to the current flowing through the oscillator by an angle of −90°. This voltage drop serves as a feedback signal. The feedback signal is routed further to the filter 44, with a phase angle rotation being performed by means of a phase shifter so that the entire phase shift of the loop reaches the zero value in the range of the working frequency $F_a$. After the amplification by means of the driver 42 the feedback voltage is supplied to the power transistor of the current switch 40 for the control thereof. The current switch 40 switches over the current flowing through the power source 39 between ground and the adaptor.

Apart from the task to filter the feedback voltage, the bandpass filter 44 also has the function to limit the frequency bandwidth of the circuit so that in the range of the amplification factor greater than one another phase zero crossing will not appear. As a result, the transient oscillation of the system is performed only on the working frequency $F_a$ because the oscillation buildup conditions of the entire system are fulfilled only for this frequency.

The switching-off can be effected either by interrupting the supply voltage E or by actuating, the switch-off means 46. In the latter case, the feedback loop is short-circuited, so that the self-excitation of the circuit is omitted.

As compared to the state in the art it is possible to achieve with the motor according to the invention reductions of the physical size by the factors 1.5 to 2. The motor has a very simple construction, and it is possible to do without the use of ball bearings. As compared to the motors known from the state of the art it has shown that, with the motors reduced according to the invention, an amplitude of the excitation voltage is obtained which is three to four times smaller, with the same functionality, resulting in a higher effectiveness, i.e. an improved efficiency.

The invention claimed is:

1. A linear ultrasound piezoelectric motor comprising a mobile element that is in frictional contact with a plate-like rectangular resonance plate, wherein the frictional surface is embodied by means of at least one of the longitudinal narrow sides of the resonance plate, and electrodes for producing acoustic vibrations which are arranged on the longitudinal wide sides of the resonance plate, characterized in that the generator for producing acoustic vibrations is asymmetrically arranged in relation to a plane which symmetrically cross-cuts the resonance plate, and comprises two opposing electrodes generating a stationary asymmetrical space wave when excited.

2. The piezoelectric motor according to claim 1, characterized in that a generator for producing acoustic vibrations is provided on both sides of the symmetrically cross-cutting plane, wherein the generators are controlled separately to reverse the direction of movement of the mobile element.

3. The piezoelectric motor according to claim 2, characterized in that the generators have a common back electrode.

4. The piezoelectric motor according to claim 1, characterized in that at least one of the longitudinal narrow sides comprises a guide groove, a guide channel or a guide rail.

5. The piezoelectric motor according to claim 4, characterized in that the guide groove, the guide channel or the guide rail has a wear-resistant coating or is made of such a wear-resistant material.

6. The piezoelectric motor according to claim 1, characterized in that the mobile element is embodied as a spring clip which is mechanically operatively connected to the longitudinal narrow sides.

7. The piezoelectric motor according to claim 6, characterized in that the spring clip is U-shaped or V-shaped, with the free legs carrying a friction element and the friction element having a shape complementary to each one of the guide groove, guide channel or guide rail.

8. The piezoelectric motor according to claim 7, characterized in that the legs of the spring clip include an attachment portion or attachment section which is formed as a holder for a mobile element, particularly a lens.

9. The piezoelectric motor according to claim 1, characterized in that the resonance plate is made of a monolithic piezoelectric body.

10. The piezoelectric motor according to claim 1, characterized in that the resonance plate is made of a non-piezoelectric material, wherein the generators for producing acoustic vibrations are mechanically rigidly connected to the resonance plate.

11. A method for electrically operating a linear ultrasound piezoelectric motor according to the features of claim 1, characterized in that the excitation source is embodied as a current feedback self-adjusting generator having a fixed working frequency, with the working frequency being predefined by that resonance frequency of the piezo-oscillator that leads to the excitation of a stationary asymmetrical space wave.

12. The piezoelectric motor according to claim 2, characterized in that at least one of the longitudinal narrow sides comprises a guide groove, a guide channel or a guide rail.

13. The piezoelectric motor according to claim 3, characterized in that at least one of the longitudinal narrow sides comprises a guide groove, a guide channel or a guide rail.

14. The piezoelectric motor according to claim 2, characterized in that the mobile element is embodied as a spring clip which is mechanically operatively connected to the longitudinal narrow sides.

15. The piezoelectric motor according to claim 3, characterized in that the mobile element is embodied as a spring clip which is mechanically operatively connected to the longitudinal narrow sides.

16. The piezoelectric motor according to claim 4, characterized in that the mobile element is embodied as a spring clip which is mechanically operatively connected to the longitudinal narrow sides.

17. The piezoelectric motor according to claim 5, characterized in that
the mobile element is embodied as a spring clip which is mechanically operatively connected to the longitudinal narrow sides.

18. The piezoelectric motor according to claim 16, characterized in that
the spring clip is U-shaped or V-shaped, with the free legs carrying a friction element and the friction element having a shape complementary to each one of the guide groove, guide channel or guide rail.

19. The piezoelectric motor according to claim 2, characterized in that
the resonance plate is made of a monolithic piezoelectric body.

20. The piezoelectric motor according to claim 3, characterized in that
the resonance plate is made of a monolithic piezoelectric body.

* * * * *